(No Model.)
J. H. WEHRLE.
ELECTRIC RAILWAY.
No. 431,634. Patented July 8, 1890.
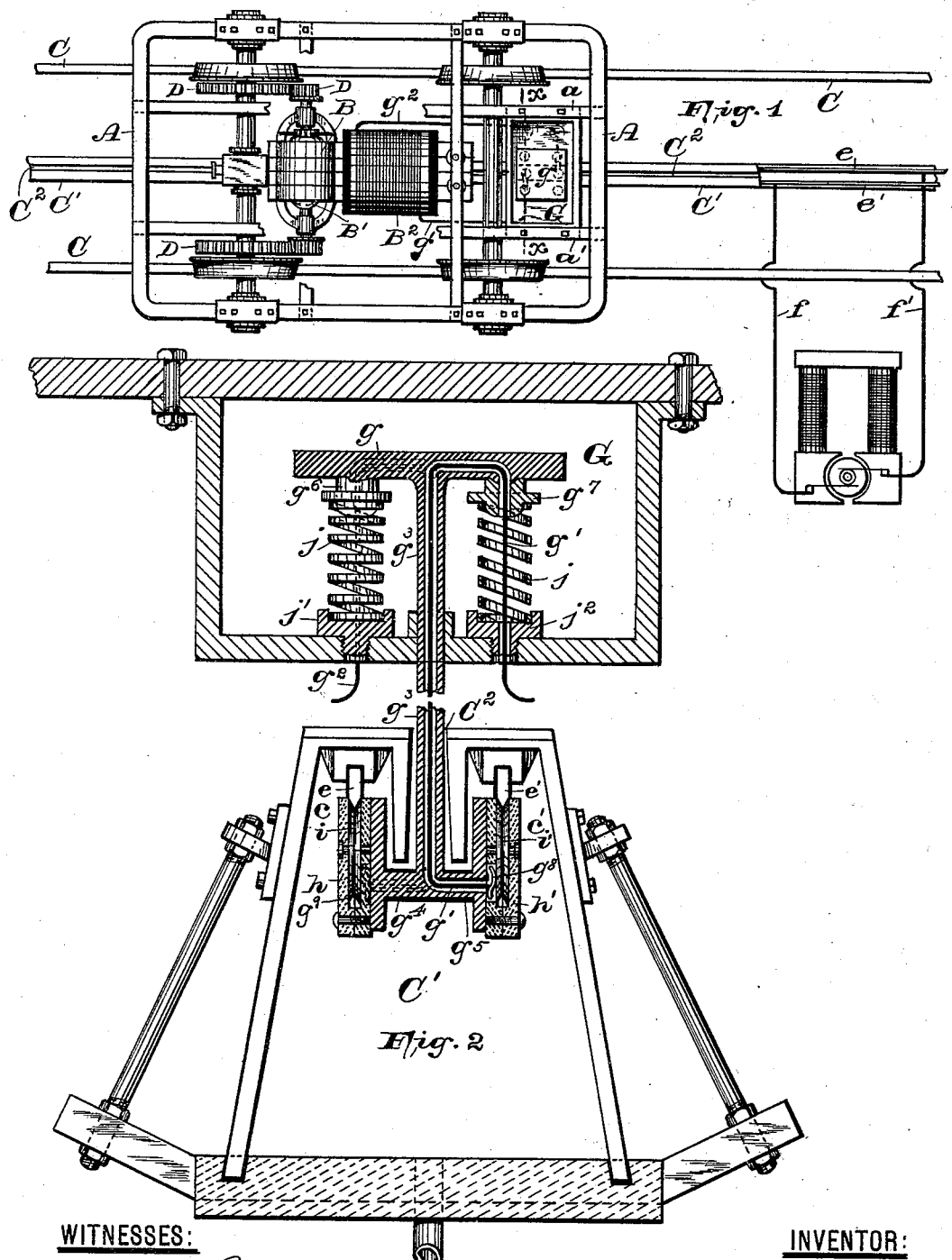

UNITED STATES PATENT OFFICE.

JOSEPH H. WEHRLE, OF NEWARK, NEW JERSEY.

ELECTRIC RAILWAY.

SPECIFICATION forming part of Letters Patent No. 431,634, dated July 8, 1890.

Application filed October 9, 1889. Serial No. 326,485. (No model.)

*To all whom it may concern:*

Be it known that I, JOSEPH H. WEHRLE, a citizen of the United States, residing at Newark, in the county of Essex and State of New Jersey, have invented certain new and useful Improvements in Electric Railways; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention is designed to provide a system for communicating electro-motive force to railway-cars or other vehicles, in which system the electrical conductors are arranged in a conduit to form a complete metallic circuit which is not exposed to moisture or water, so that the electric currents may at all times be conducted to the motor in the car, and in which there is no danger of a ground-connection, and thereby cause no delays or breaks in the system due to the loss of the electricity where the electric conductors have become submerged in water or to the dampness in the ground.

The most important feature of my present invention, by means of which I impart motion to an electromotor arranged in a railway-car, consists in providing the magnets of the motor with cables or conducting-wires, which are connected at their free ends with a contact-making device adapted to make electrical connection with independent electric conductors or rails arranged in a conduit or duct.

The invention consists, generally, in the organization of the following systems of apparatus and of combining all or any of the specific features in one, as may be desirable for the particular purpose.

In employing the method set forth herein I desire to employ between the rails an underground conduit, such as has been described and claimed by myself in a previous application filed September 28, 1889, Serial No. 325,437, in which the electrical conductors are arranged therein in compartments or chambers on both sides of the slot in the top of the conduit, formed by inwardly and downwardly projecting flanges or walls, behind which and above the lowest edges of the same said electrical conducting-rails are situated, free from water and any moisture or dampness in the ground, and which conductors are connected at the end of the line with an electrical generator or dynamo at the central station. A carriage or contact-making device, adapted to run on the rails constituting the electric conductors within the conduit, is secured by suitable mechanism to the bottom of the railway-car and provided with a cable or wires having brushes or contact-making springs on the ends engaging with the wheels of the carriage in the conduit, and thereby causing the electricity in the conducting-rails to be conducted to the electric motor arranged in the car.

In the accompanying sheet of drawings, illustrating my invention, Figure 1 represents a plan view of a truck of an electric-railway car, showing the same in position on the rails, provided with an electromotor and the means for connecting said motor with the conductors in the conduit. Said figure also illustrates the circuit connecting the conductors in the conduit with a generator or dynamo at the central station. Fig. 2 is a section taken through $x$, Fig. 1, illustrating the manner of making the connections with the electric conductors or rails in the conduit, the mechanism—such as the carriage—and the means for securing the same to the bottom of the car being shown in section, while the conduit is illustrated in end elevation.

In order that the description and operation of the system may be fully understood, I will now describe, by reference to the drawings, the features and elements embodying my invention.

Similar reference-letters are employed to indicate corresponding parts in each of the views.

In the above-described views, A indicates the truck of a car; B, any well-known electromotor or machine, of which B' is the armature and $B^2$ the field-magnet. Between the rails C C is arranged a conduit or duct C', provided in its upper side with an open and continuous slot $C^2$. The electric motor B communicates motion by means of cog-wheels D D from the armature-shaft of the machine to one of the axles of the truck of the electric-railway car.

As illustrated in Fig. 2, within the conduit $C'$, which is of the construction described in my application for a patent filed September 28, 1889, Serial No. 325,437, are arranged within the chamber or compartments $c$ and $c'$, formed by inwardly and downwardly projecting flanges on each side of the slot, the electrical conducting-rails $e$ and $e'$, which form the two sides of the circuit, and which are connected at any point in the line by means of the wires $f$ and $f'$ with the main electrical source or dynamo at the central station, as shown in the plan view in Fig. 1. The electric conductors or rails $e$ and $e'$ are secured above the lowest edges of said flanges within the conduit in any well-known manner, as will be understood, and are thereby kept free from water entering the slot, whereby the electrical contact might be destroyed and the electricity carried off through the material of the conduit and to the ground. To the cross-braces $a$ and $a'$ of the truck is secured or attached a box G, within which is arranged a carriage or trolley-carrying plate $g$, which is provided with ducts therein, through which pass the insulated cables or wires $g'$ and $g^2$, which are connected with the field-magnets at one end, as shown in Fig. 1, and which complete the circuit at their opposite ends by means of the wheels of the carriage or trolley, and thereby make contact with the electric conducting-rails $e$ and $e'$, as illustrated in Fig. 2.

The plate $g$ is provided with a downwardly-projecting arm $g^3$, which extends down through the slot $C^2$ and into the interior of the conduit, and has at its lower end two oppositely-projecting arms $g^4$ and $g^5$, to which are secured in any convenient manner the trolley or wheel-carrying boxes $h$ and $h'$. Said boxes are made in halves of fibrous or insulating material, which are bolted or screwed together, and between said halves, which are cut away to conform with the shape of the contact-wheels, as shown, are arranged said contact-wheels $i$ and $i'$, which run on the electric conducting-rails, which are preferably V-shaped, as shown in Fig. 2. Said rails $e$ and $e'$, however, may be of any form or shape in cross-section.

The plate $g$ is held in position within the box G by means of four spiral springs $j$, as indicated by their dotted positions in Fig. 1, which springs are secured within perforated sockets $j'$ and $j^2$, screwed or otherwise fastened to the bottom of the box G. Lugs $g^6$ and $g^7$ are formed on the under side of said plate $g$, to which the springs are fastened, and which thereby securely hold the same in position.

The manner of making the electrical connections is as follows: When the circuit through the conducting-rails $e$ and $e'$ has been completed and the carriage has been placed in position on said conducting-rails, electrical contact is made by means of the wheels $i$ and $i'$. Within the plate $g$ and its downwardly-extending arm $g^3$ are arranged in separate ducts therein the insulated cables or wires $g'$ and $g^2$, as has been stated in the above. On the free ends of said cables or wires are arranged springs or brushes $g^8$ and $g^9$, as shown in Fig. 2, which make connection with the contact-wheels $i$ and $i'$, respectively. The cables or wires $g'$ and $g^2$ extend and pass upwardly through the ducts or passages in the arm $g^3$, and thence through the plate $g$ on opposite sides and through the centers of two of the plate-supporting springs $j$, and out of the box G beneath the car, where they are connected with the field-magnet or the armature or the electromotor, as illustrated. Thus a complete circuit has been established through the conducting-rails in the conduit, the contact-wheels running thereon, and through the cable or wires communicating with the magnets of the motor and back to the dynamo at the central station, the current thus causing the dynamo-electric machine to run as a propelling-motor.

It is evident from Fig. 2 that the arm $g^3$ moves in a sleeve in the bottom of the box G, which allows the same to reciprocate in said sleeve during the settling of the box when the car is heavily loaded. The springs $j$, which are of sufficient strength, tend to force the plate $g$ upwardly, and thereby normally hold the same in one position, no matter how great the weight on the truck, and the contact-wheels $i$ and $i'$ are constantly forced up against the conducting-rails within the conduit by means of said springs $j$, and thereby complete the circuit to the motor in the car.

I do not wish to be understood as limiting my invention to the particular construction of the contact-making carriage shown herein, nor the manner herein shown of securing the box G, &c., to the truck, as I may vary the detail construction of the same without departing from the scope of my invention.

The many advantages of this system over those now in use will readily be seen. There is no danger from overhead wires, and by arranging the conducting-rails within a conduit behind the inwardly and downwardly projecting flanges forming the chambers or compartments therein the conductors are at all times free from dirt and water, a complete metallic circuit thereby being maintained, and thus no stops or delays will be caused to the running of the cars, as is the case where the conductors are liable to become wet or dirty.

Although the wires $g'$ and $g^2$ are shown as connected with the field-magnet of the motor, said wires may be connected to the armature of the motor, if desirable.

Having thus described my invention, what I claim is—

1. The combination, with a car or train of cars on an electric railway, of an electric motor having the magnets thereof supplied from a line making connections with continuous electrical conductors or rails arranged in an open-slotted conduit, said slot therein being formed by inwardly and downwardly projecting flanges, forming continuous chambers or compartments without a break in the top of the conduit, and said electrical conductors or rails being arranged in said chambers or compartments behind the said flanges and above the lowest parts thereof, whereby a direct and complete metallic circuit is established entirely within the continuous compartments or chambers through the entire length of the conduit, for the purposes set forth.

2. The combination, with a car or train of cars on an electric railway, of an electric motor having the magnets thereof supplied from a line making connections with continuous electrical conductors or rails arranged in an open-slotted conduit, said slot therein being formed by inwardly and downwardly projecting flanges, forming continuous chambers or compartments without a break in the top of the conduit, said electrical conductors or rails being arranged in said chambers or compartments behind the said flanges and above the lowest parts thereof, whereby a direct and complete metallic circuit is established entirely within the continuous compartments or chambers through the entire length of the conduit, and contact being established with said complete metallic circuit by means of contact-wheels adapted to run on said electrical conductors or rails, for the purposes set forth.

3. The combination, with a car or train of cars on an electric railway, of an electric motor having the magnets thereof supplied from a line making connections with continuous electrical conductors arranged in an open-slotted conduit, said slot being formed by inwardly and downwardly projecting flanges, which form continuous compartments or chambers through the entire length of the conduit and without a break in the top, said electrical conductors being arranged in said chambers above the lowest parts of said flanges and forming a complete metallic circuit and continuous rails through the entire length of the conduit, a connecting carriage or trolley adapted to run in said conduit and to make electrical connections with said complete circuit, and means for attaching said carriage or trolley to a car, for the purposes set forth.

4. The combination, with a car or train of cars in an electric railway, of an electric motor having the magnets thereof supplied from a line arranged in ducts within a carriage or trolley carrying plate, said plate being arranged within a box secured to the car and provided with a downwardly-extending arm projecting into an open-slotted conduit, said slot being formed by inwardly and downwardly projecting flanges and provided with contact-making wheels thereon, projecting up behind said flanges, said line supplying the magnets of the motor, passing down through ducts in the said arm and connecting with the contact-wheels thereon, and electrical conducting-rails arranged within and on both sides of the slot in the conduit behind the downwardly-projecting flanges and above their lower edges, and on which said contact-wheels run and make conducting-rails contact therewith, as and for the purposes set forth.

5. The combination, with a car or train of cars on an electric railway, of an electric motor having the magnets thereof supplied from a line connecting with a conducting-line arranged in an open-slotted conduit, said conduit being provided with continuous chambers or compartments on both sides of the slot, in which chambers said conducting-lines are arranged, a carriage or trolley carrying plate secured to the bottom of the car and provided with an arm extending downwardly and into the slot of the conduit, and having arms thereon provided with contact-making wheels thereon, which extend up into the chambers in the conduit and make contact with the conducting lines or rails therein, said magnet-supplying line passing down through ducts in the carriage-carrying plate and its arm thereon and making contact with the wheels thereon by means of brushes, springs, or other means, as and for the purposes set forth.

6. In an electric-railway system, an open-slotted conduit made up of abutting sections forming a continuous open top or slot and provided with inwardly and downwardly projecting walls or flanges arranged along the entire length of each section and said walls or flanges abutting end to end, and thereby forming continuous compartments or chambers without a break in the top of the conduit, continuous electrical conductors or rails arranged in said chambers behind said flanges and above the lowest parts thereof, whereby a direct and complete metallic circuit is established through said chambers and entirely within the same, a contact-making device adapted to run on said rails, means extending up through the slot in the conduit and adapted to be secured to a car, an electric motor secured to said car, and a line connecting the magnets of said motor with said contact-making device in the conduit, for the purposes set forth.

7. The combination, with a car or train of cars on an electric railway, of an electric motor having its armature-shaft connected mechanically with one of the axles of a car and its magnets connected with a line adapted to be connected with a carriage or trolley, said carriage or trolley being secured to the car by suitable mechanism which extends down into a slot in a conduit arranged between the traction-rails upon which said car runs, said conduit being made up of abutting sections provided with downwardly-projecting flanges or walls abutting end to end in each adjacent pair of sections, and thereby forming continuous compartments or chambers without a break in the top of the conduit, continuous electrical conductors or rails in said chambers, arranged therein behind said flanges and above the lowest parts thereof, whereby a direct metallic circuit is established entirely within the continuous compartments or chambers through the entire length of the conduit, and the contact-wheels of the carriage or trolley extending up behind said downwardly-projecting flanges and adapted to run on said continuous rails and make electrical contact therewith, for the purposes set forth.

8. In an electric-railway system, a conduit having a continuous open top or slot and provided with downwardly-projecting flanges or walls abutting end to end, which form continuous chambers or compartments in the top of said conduit on both sides of the slot therein, continuous conducting-rails arranged entirely within said compartments, connected with an electricity generator or dynamo and making a complete circuit therethrough, a carriage or trolley adapted to run on said rails, and a cable or wires adapted to make contact at one end with the wheels of said trolley and connected at the opposite ends with the magnets of an electric motor secured to the bottom of a car, and means for connecting said motor mechanically to the axles of the car, as and for the purposes set forth.

9. In an electric-railway system, the combination, with a car provided with a spring-supported plate having ducts for electrical wires or cables therein, of an electric motor connected to said wires at one end, trolley-wheels connected at the other ends of said wires, running in chambered boxes of non-metallic insulating material and upon and making connection with a pair of electrical conductors arranged in an open-slotted conduit, for the purposes set forth.

10. In an electric-railway system, in combination with a car provided with a spring-supported plate having at its lower end oppositely-projecting arms, ducts for electrical wires or cables in said plate and electric motor connected at one end with said wires, trolley-wheels connected with the other ends of said wires, running in chambered boxes of non-metallic insulating material and upon and making connection with a pair of electrical conductors arranged in a conduit, for the purposes set forth.

11. In an electric-railway system, in combination with a car provided with a spring-supported plate having ducts for electrical wires or cables therein, an electric motor connected with said wires, divided trolley-wheels arranged in separable halves, of a non-metallic insulating-box, spring-contacts connecting with said trolley-wheels and the wires in said spring-supported plate, and conducting-rails forming a complete and independent metallic circuit upon which said trolley-wheels run, said conducting-rails being arranged in an open-slotted conduit, as and for the purposes set forth.

12. In an electric-railway system, in combination with a car provided with a spring-supported plate having ducts for electrical wires or cables therein, an electric motor connected with said wires, divided trolley-wheels arranged in separable halves of a non-metallic insulating-box, spring-contacts connected with said trolley-wheels and the wires in said spring-supported plate, and conducting-rails forming a complete and independent metallic circuit upon which said trolley-wheels run, said conducting-rails being arranged in an open-slotted conduit, which consists of a base having grooves running parallel in the direction of its length, adjoining plates arranged in said grooves, said plates being provided with a downwardly-projecting drip-opening, which forms said slot and chambers or compartments on both sides thereof, in which said conducting-rails are arranged, for the purposes set forth.

13. The combination, with a car or train of cars on an electric railway, of an electric motor having its magnets supplied from a line making connections with continuous electrical conductors or rails arranged in a conduit composed of a base-plate having opposite plates or sections arranged thereon in the direction of its length, said plates meeting end to end and provided with a downwardly-projecting drip-opening, which forms a continuous open slot in the top of the conduit, and open-bottomed chambers or compartments therein on both sides of said slot, in which said conductors or rails are arranged, for the purposes set forth.

14. The combination, with a car or train of cars on an electric railway, of an electric motor having its magnets supplied from a line making connection with continuous electrical conductors or rails arranged in a conduit composed of a base-plate having opposite plates or sections arranged thereon in the direction of its length, said plates meeting end to end and provided with a downwardly-projecting drip-opening, which forms a continuous open slot in the top of the conduit, and open-bottomed chambers or compartments therein on both sides of said slot and in which chambers said conductors are arranged, and a carriage or trolley adapted to run on said conductors and connected with the line making connection with the motor-magnets, for the purposes set forth.

15. The combination, with a car or train of cars on an electric railway, of an electric motor having its magnets supplied from a line making connections with electrical conductors arranged in an open-slotted conduit, said conduit being provided with continuous compartments or chambers in the top thereof on each side of said slot, said chambers being open at the bottom and provided with openings in the top at intervals on opposite sides of the slot, covers in said openings, and said electrical conductors being arranged entirely within said compartments or chambers, and means for connecting said motor-supplying line with said electrical conductors in said chambers, for the purposes set forth.

In testimony that I claim the invention set forth above I have hereunto set my hand this 28th day of September, 1889.

JOSEPH H. WEHRLE.

Witnesses:
FREDK. C. FRAENTZEL,
MARTIN WEHRLE.